June 15, 1937.  P. McILROY  2,084,209
COATED METAL PIPE AND PROCESS OF PRODUCING THE SAME
Filed June 28, 1934
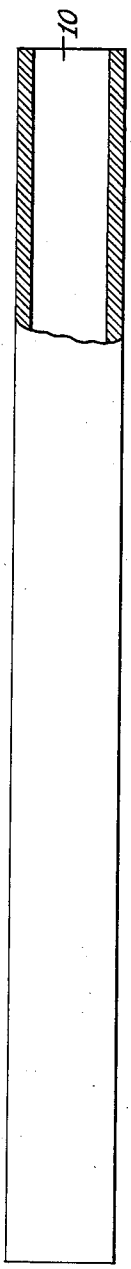
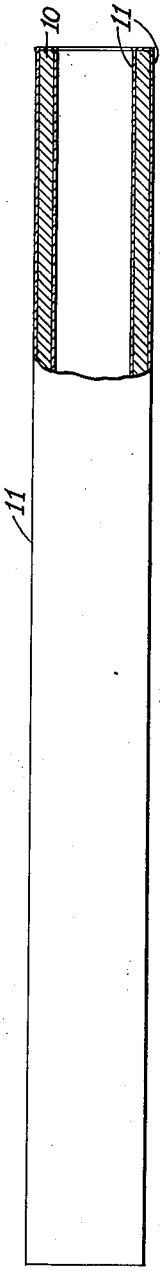
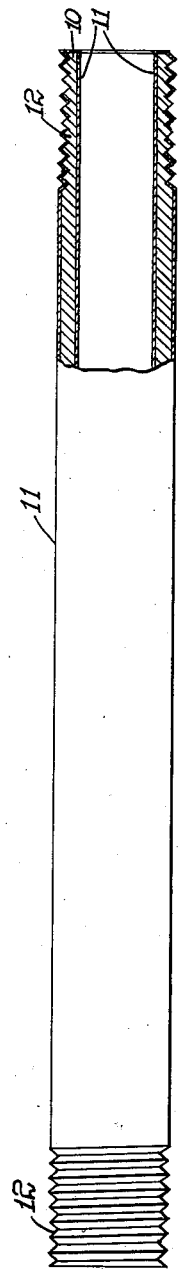
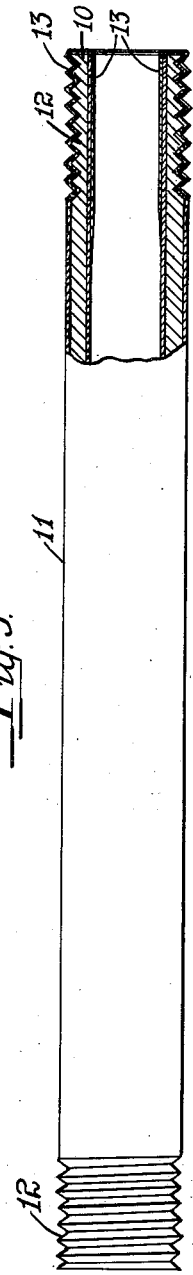
INVENTOR
Peter McIlroy
By Green & McCallister
His Attorneys Patented June 15, 1937

2,084,209

UNITED STATES PATENT OFFICE 2,084,209

COATED METAL PIPE AND PROCESS OF PRODUCING THE SAME

Peter McIlroy, Pittsburgh, Pa., assignor to Enameled Metals Company, a corporation of Pennsylvania Application June 28, 1934, Serial No. 732,841

6 Claims. (Cl. 91—70.2)

My present invention relates to a method of coating metallic pipe and to coated metal pipe used for all purposes, but more particularly to that type of pipe or piping known as electrical conduit and widely used for enclosing electrical wiring.

It is well known to hot galvanize pipes or conduits to give them a protective coating which prevents rusting or other deteriorating action. In hot galvanizing pipes and conduits, the practice is to thread the material after the galvanizing is complete. This threading necessarily removes the protective coating from the threaded portions of the pipe or conduit and accordingly the threads and even adjacent portions of the pipe are not adequately protected. It has, furthermore, been attempted to thread the pipe or conduit prior to the hot galvanizing process but this has proved to be a failure due to the fact that the galvanizing metal fills or clogs the threads. Such coating must, moreover, be removed and this removal, as by burnishing or otherwise, invariably breaks the protective coating at least at some points and, therefore, the threads are inadequately protected against rusting or deterioration. Even a small defect or break in the coating permits deterioration to set in which spreads under the coated portions. It is impossible to apply a protective metal coating by a hot galvanizing operation to threaded portions of pipes, even though the attempt is made to preform the threads to accommodate the application of the metallic coating because the coating metal cannot be applied uniformly over an irregular surface such as presented by screw threads, and there is little or no control over the thickness of the coating metal. In some instances ungalvanized threads on such pipes or conduits have been painted or lacquered, but this is objectionable and unsatisfactory where the pipe or conduit is used in electrical work since it must act as a ground. Painting or lacquering interferes with this grounding function and in many localities it is required that an electrical union or contact be established and maintained between each section of pipe or conduit. Thus there is no satisfactory product on the market at the present time which completely fulfills the necessary functions and purposes.

I have discovered that the foregoing and other defects and disadvantages can be obviated by hot galvanizing the pipe or conduit prior to threading any portion of the same, threading such portions thereof as require threading, and then cold galvanizing the threaded portions and any of the base metal exposed by the threading operation.

One of the objects of my present invention is, therefore, to produce pipe or conduit which has the necessary and requisite corrosion-resistant and electrical properties.

Another object of my invention is to provide pipe or conduit of the kind described with a relatively heavy galvanized coating on the major or body portion thereof and a relatively thin galvanized coating on the threaded portion or portions thereof such that the thread size is not interfered with and the couplings between the threaded portions can be readily applied without cutting or otherwise harming the protective coating on the threads.

A further and more specific object is to hot galvanize an entire length of pipe or conduit prior to the threading of any portion thereof, to thread such portions thereof as require threading, and to apply an adequate but controlled coating of protective metal to such portions of the pipe or conduit as are exposed by the threading operation and to do this in such a way that a compact coating of uniform thickness is deposited on the portions of the pipe or conduit thus exposed by the threading operations.

Other and further objects will be understood by those skilled in this art or will be apparent or pointed out hereinafter.

In the accompanying drawing:

Figure 1 is a view of a length of uncoated, unthreaded pipe or conduit;

Fig. 2 is a view of a length of pipe or conduit after hot galvanizing it;

Fig. 3 is a view of a length of pipe or conduit after threading the ends thereof; and Fig. 4 is a view of a length of pipe or conduit after cold galvanizing the threaded ends.

Referring to the drawing the numeral 10 indicates a length of unthreaded, uncoated pipe or conduit adapted for the purpose set forth herein. This pipe or conduit 10 may be of any suitable material, length, diameter, and wall thickness depending, of course, upon the particular use to which it is to be put or for which it is intended in any given case. This uncoated, unthreaded length of pipe or conduit is then hot galvanized so that a relatively thick zinc coating 11 is provided over the entire outer surface of the length of pipe or conduit, the inside surface being also simultaneously coated when a coating is desired on the inside. The pipe or conduit is then threaded, for example, at each end as indicated by the numerals 12, and the threading operation results in removing more or less of the galvanizing coating 11 previously applied and consequently the metal of the pipe or conduit is not only exposed at the threaded portions 12, but is in such condition that it cannot well withstand corrosive and deteriorating conditions to which it may be subjected. I next cold galvanize the threaded portions 12 of the pipe or conduit and any other portions thereof exposed by the threading operations. This operation deposits a relatively thin, but a compact and uniform coating of protective metal 13 on the exposed metal of the pipe or conduit. This thin coating 13 gives adequate protection against corrosion and deterioration but at the same time does not interfere with the coupling of a number of such lengths of pipe or conduit and this relatively thin coating does not clog or fill the threads. In addition, the cold galvanizing operation may be controlled so as to produce an adequate coating but one of controlled thickness.

Accordingly, I have produced in this manner a pipe or conduit which has a body portion provided with a relatively thick hot galvanized coating and one or more threaded portions each of which is provided with a relatively thin cold galvanized coating and which has the necessary and requisite corrosion resistant and electrical properties and characteristics. There is no point or points on my finished pipe or conduit whereat corrosion can start and at the same time the coating is of such a nature that the pipe or conduit can properly function as a ground where it is used as conduit for electrical wiring purposes and otherwise does not interfere with any of the desired functions when the pipe or conduit is used for other purposes.

The hot galvanizing of the unthreaded, uncoated length of pipe may be carried out in any suitable or known manner. For example, the pipe may be cleaned from scale and rust by pickling in warm dilute sulphuric acid, washed, immersed in an alkaline bath to neutralize the acid of the pickling solution, again washed and then dried and immersed in a suitable bath of molten zinc in which any desired flux may be present as is known in the art. Or, I may clean the pipe or conduit by pickling and dipping in a solution of hydrochloric acid and then immersing the pipe or conduit in a bath of molten zinc at a temperature of from about 800° to 900° F. and when the pipe or conduit has reached the temperature of the bath it is withdrawn and the coating set in water, any suitable flux such as ammonium chloride with or without other fluxing agents being present in a manner known in the art.

The threading operations are carried out in any conventional or known manner to produce a thread of the required size, pitch and length. The art of threading is old and well known.

The cold galvanizing may be carried out, for example, by dipping or otherwise treating the threaded portions of the pipe or conduit and any metal exposed by the threading operations in a suitable bath or electrolyte. This bath or electrolyte is at a moderate temperature and may be relatively cold, for example, about room temperature or somewhat above and the portions of the pipe or conduit to be cold galvanized are subjected to treatment in or with such bath or electrolyte for a sufficient length of time to form a thin but complete coating of zinc over and on such portions. This cold galvanizing is in the nature of a chemical deposition or an electroplating step. In other words, the bath or electrolyte is of such a nature that when the desired portions of the pipe or conduit are exposed thereto or treated therewith, a thin film or coating of zinc deposits upon the portions subjected thereto. Since the carrying out of such cold coating is in the nature of a chemical deposition or electroplating the thickness of this film or coating can be accurately controlled and kept to the minimum thickness which at the same time forms a complete protective covering for the parts of the metal involved.

The foregoing is intended more in an illustrative manner than in a limitative sense because I may make certain additions, modifications, variations and omissions therefrom while at the same time remaining within the spirit and scope as well as within the principles of the invention as herein set forth. For example, it is within the purview of this invention to utilize pipe or conduit of any metal or alloy composition which is recognized as suitable for the purposes herein described. Again, I am not strictly limited to the production of zinc films or coatings but I may apply this invention to other materials which will give the pipe or conduit corrosion resistant properties with requisite electrical characteristics,—where the pipe or conduit is used for electrical purposes,—and with appropriate properties desirable under the facts and circumstances of other uses. Such may include copper, chromium, cadmium, and/or other metals which are not too expensive and which are susceptible to treatment according to the principles herein described.

What I claim as new and desire to secure by Letters Patent is:

1. A metal pipe consisting of an unthreaded body portion and at least one threaded terminal portion, said body portion having thereon a relatively thick hot galvanized coating and said threaded portion having thereon a relatively thin cold galvanized coating.

2. A process of producing coated metal pipe for conduit for electrical wiring purposes comprising hot galvanizing a length of such pipe prior to threading any portion of it to provide a relatively thick coating on the whole length of pipe, forming suitable threads on such coated pipe, and then cold galvanizing the threads to provide thereon a relatively thin coating.

3. Electrical conduit having a body portion and threads suitably formed thereon, said body portion being provided with a relatively thick hot galvanized protective coating and said threads being provided with a relatively thin protective cold deposited metallic coating, said electrical conduit being characterized by being non-corrodible and by unimpaired capacity for acting as a ground, said thin protective coating being selected from the group: zinc, cadmium, chromium, copper.

4. A process of producing coated metal pipe comprising hot galvanizing a length of uncoated, unthreaded metal pipe, providing the ends of such coated length of pipe with suitable threads and then cold galvanizing the threads only of such pipe.

5. Pipe consisting of a tubular metal body, the outer surface of which is threaded at its ends, a hot galvanized coating on the inner surface and on the unthreaded portion of the outer surface and a cold galvanized coating on the threaded ends and on the ends of the inner surface.

6. A process of producing coated metal pipe of the kind described comprising preparing a length of uncoated, unthreaded metal pipe for the reception of coating material, hot galvanizing such uncoated unthreaded pipe, forming threads on the ends thereof and then cold galvanizing only such threads.

PETER McILROY.